Aug. 11, 1964 J. W. HARGIS ET AL 3,144,353

POLYOLEFIN COATED WITH THERMOSET COATING USED IN MAGNETIC RECORDING MEDIA

Filed March 8, 1963

JOHN W. HARGIS
DERVIN L. FLOWERS
*INVENTORS*

BY Robert G. Clay

ATTORNEY 3,144,353
Patented Aug. 11, 1964

3,144,353

POLYOLEFIN COATED WITH THERMOSET COATING USED IN MAGNETIC RECORDING MEDIA

John W. Hargis, Palo Alto, and Dervin L. Flowers, Redwood City, Calif., assignors to Ampex Corporation, Redwood City, Calif., a corporation of California Filed Mar. 8, 1963, Ser. No. 265,005
8 Claims. (Cl. 117—138.8)

This invention relates to improvements in the materials used for making magnetic recording media and more particularly relates to a novel coating for use with polyolefin tape bases.

Polyolefin plastics, and particularly polypropylene, form highly desirable tape bases since these materials are inexpensive, fire resistant, strong, and, most important of all, have an extremely smooth surface so that tapes having good short wave length response and low drop-out characteristics can be manufactured. However, such tape bases do have one drawback, since conventional tape coatings such as those which are conventionally used with materials such as cellulose acetate and Mylar (polyethylene terephthalate) do not stick to the polyolefin bases. Although this can be partially alleviated by means known in the printing art, such as heat treatment or electric corona discharge treatment, the results are not fully satisfactory and poor adherence is obtained when one attempts to use conventional coating formulations such as those based on finely divided magnetic particles dispersed in vinylidene chloride, vinyl acetate-vinyl chloride copolymers and similar resin mixtures.

In accordance with the present invention, a novel thermosetting coating composition is provided which has strong adherence to polyolefin tape bases. The tough adherent coating of the present invention can be employed either as a subcoating or as a carrier for magnetic particles. In the former, a polyolefin tape base is first coated with a thin coating of the novel polymer system hereinafter described, whereupon the thus-coated base becomes receptive to conventional tape coating formulations. On the other hand, the novel coating formulations of the present invention can be the actual carrier for the magnetic particles; the magnetic particles can be dispersed in the novel coating formulation of the present invention and applied directly to a polyolefin tape base. It is also possible to pigment the subcoating and then apply a conventional pigmented formulation thereover, which is particularly advantageous when it is desired to provide a double coated tape wherein the coatings have different magnetic characteristics.

When using the coating formulation of the present invention as a subcoating, the subcoating may or may not be cured prior to the application of a conventional coating formulation. Under some circumstances, it is desirable to place the subcoating on the tape base and then cure it, and the second coating can be placed on the tape at some later time. It is also possible to apply the subcoating and immediately thereafter, by the employment of a tandem coater, apply a conventional formulation and then cure both coatings simultaneously. Alternatively, the tandem coater can be employed with some heating between the two coaters, so that the subcoating is partially cured prior to the application of the second coating.

The novel coating composition of the present invention comprises three components. The first component is a copolymer of styrene or substituted styrene and butadiene, isoprene, acrylonitrile or chloroprene, and typical copolymers which are suitable for the purposes of the present invention comprise 20 to 80 parts by weight of styrene or substituted styrene and 80 to 20 parts by weight of butadiene, isoprene, chloroprene or acrylonitrile. The polymers can be modified by the introduction of hydroxyl, ketonic or acidic substituents.

A typical copolymer of this class which is preferred for the purposes of the present invention is sold under the trade name Buton 300. This copolymer is composed of four parts by weight of styrene to one part of butadiene and has an average molecular weight of from 8,000 to 12,000. Satisfactory binder or subcoating compositions can be prepared containing from 25% to 70% by weight, on a solids basis, of the copolymer.

The second component is a resin which is a melamine or urea condensation product with formaldehyde, with an acid number of from 0 to 15 and preferably from 1 to 5. The resin can advantageously be employed in percentages of from 5% to 20% on a solids basis. A typical preferred example of a suitable melamine resin is sold under the trade name Uformite MM–55.

The third component is a catalyst. In the past, resin compositions containing a copolymer of styrene and butadiene, together with a melamine-formaldehyde composition, have been proposed wherein an acid catalyst is used to polymerize the resins.

However, we have found that superior results are obtained if a poly-fatty acid amide is used as the catalyst. The general formula for these amides is $$HO—(OC—R—CONHR'—NH)_n—H$$

where R and R' are straight or branched chain organic radicals of from 10 to 22 carbon atoms and may or may not be the same, and $n$ is such that the molecular weight is from 3,000 to 8,000. A typical example of such a resin is sold under the trade name of Versamid 415. The poly-fatty acid amide can be used in amounts of from 15% to 70% by weight on a solids basis.

The three components are merely mixed together in the presence of a suitable solvent to provide the coating. Suitable solvents include toluene, xylene, tetrahydrofuran, methyl ethyl ketone, and mixtures thereof. Ordinarily, a very dilute solution is prepared wherein the resin concentration is from 1% to 10%. If a magnetic pigment is to be employed, it is ground into the resin composition by means well known to those skilled in the art, such as by the use of a ball mill. Normally from 65% to 90% of the magnetic pigment is employed on a resin solids basis. The coating thickness will depend on the manner in which the material is to be used. If used as a subcoating for a conventional magnetic tape formulation, a thickness of 0.005 to 0.1 mil is suitable, while if the material is pigmented, a thickness of 0.2 to 0.5 mil is suitable.

In the drawing forming part of this application:

Figure 1:
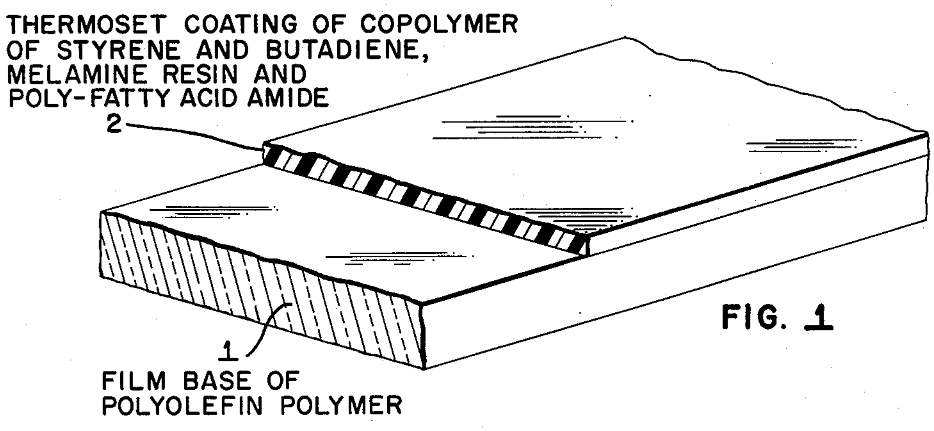
FIGURE 1 is an enlarged sectional view of a tape embodying the present invention wherein a film base 1 of a polyolefin polymer has as a thermoset coating 2 thereon a copolymer of styrene and butadiene, melamine resin and poly-fatty acid amide.
Figure 2:
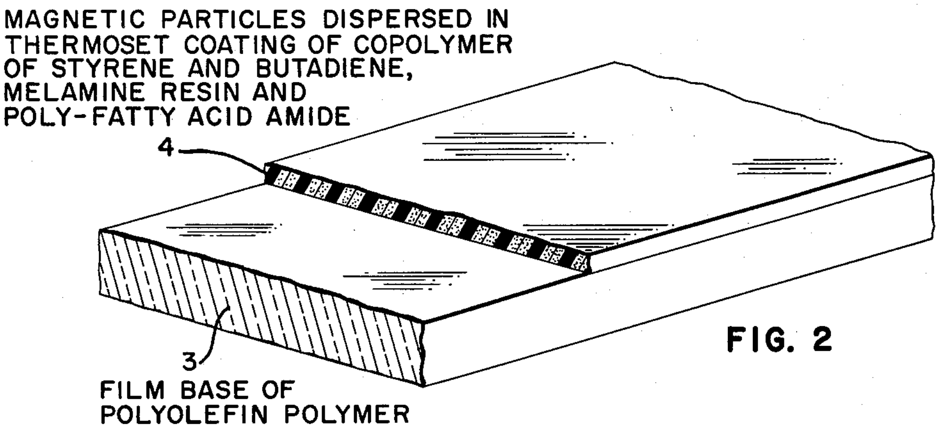
FIGURE 2 is a similar enlarged prospective view of a tape embodying the present invention wherein a film base 3 has a coating 4 thereon wherein magnetic particles are dispersed in a thermoset coating of a copolymer of styrene and butadiene, melamine resin and poly-fatty acid amide.

The following non-limiting examples illustrate various methods of practicing the present invention.

*Example I*

A mixture was made containing 66.6 parts by weight of a styrene-butadiene copolymer (Buton 300), 16.6 parts by weight of a melamine resin (Uformite MM–55), and 16.8 parts by weight of a fatty-acid polyamide (Versamid 415). Five percent by weight of this mixture was added to 95% by weight of a solvent mixture containing equal parts of xylene and methyl ethyl ketone. After thorough mixing, a polypropylene tape was coated with the mixture and immediately thereafter a magnetic coating formulation containing Saran (vinylidene chloride polymer), a copolymer of vinyl acetate and vinyl chloride with acicular gamma ferric oxide dispersed therein (75% on a solids basis) was applied thereover. The thus-coated tape was passed through an oven to remove the solvent and to cure the resin. The finished tape was tested and had good magnetic properties, and it was found that the coating was adherent.

*Example II*

Example I was repeated except that after the initial coating was applied, the coated tape was passed through an oven and the plastic thermoset. The tape was stored for several days before the second coating was applied, and after the application of the second coating it had substantially the same characteristics as the tape described in Example I.

*Example III*

A mixture was made containing 45 parts by weight of a copolymer of styrene and butadiene, 11.3 parts by weight of melamine resin, and 43.7 parts by weight of a poly-fatty acid amide. Three parts by weight of this resin mixture was added to 97 parts by weight of toluene, together with 80 parts by weight (on a resins solid basis) of gamma ferric oxide. This mixture was then ball milled for 36 hours and coated directly onto a polypropylene tape base whereupon the tape was tested and found to have good magnetic and electrical properties.

*Example IV*

The process of Example I was repeated except that 26.7% of the copolymer was used, 6.6% of the melamine was employed, together with 66.7% of the poly-fatty acid amide.

*Example V*

The process of Example III was repeated except that 35% of the copolymer was employed, with 10% of melamine and 55% of the polyamide.

What is claimed is:

1. As a new article of manufacture a film base of a polyolefin polymer having a thermoset coating thereon, said coating comprising on a resin solids basis:

(*a*) from 25% to 70% of a copolymer of styrene and butadiene containing from 20% to 80% styrene and 80% to 20% butadiene;

(*b*) from 5 %to 20% of a melamine resin, said resin being a melamine-formaldehyde condensation product with an acid number of from 0 to 15; and (*c*) from 15% to 70% of a poly-fatty acid amide of the formula:

$$HO—(OC—R—CONHR'—NH)_n—H$$

wherein R and R' are selected from the group consisting of straight and branched organic radicals of from 10 to 22 carbon atoms and *n* is such that the molecular weight of the amide is from 3000 to 8000.

2. The article of claim 1 wherein the coating has dispersed therein finely divided magnetic particles.

3. The article of claim 1 wherein the film base is polypropylene.

4. The article of claim 1 wherein the base is from about .5 to 1.5 mils in thickness and the coating is from 0.005 to 0.5 mil in thickness.

5. The article of claim 1 wherein the coating comprises the following percentages: copolymer of styrene and butadiene 66.6; melamine resin 16.6; and poly-fatty acid amide 16.8.

6. The article of claim 1 wherein the coating comprises the following percentages: copolymer of styrene and butadiene 45.0; melamine resin 11.3; and poly-fatty acid amide 43.7.

7. The article of claim 1 wherein the coating comprises the following percentages: copolymer of styrene and butadiene 26.7; melamine resin 6.6; and poly-fatty acid amide 66.7.

8. The article of claim 1 wherein the coating comprises the following percentages: copolymer of styrene and butadiene 35.0; melamine resin 10.0; and poly-fatty acid amide 55.0.

References Cited in the file of this patent

UNITED STATES PATENTS

| | | |
|---|---|---|
| 2,589,567 | Nickerson | Mar. 18, 1952 |
| 2,630,420 | Gleim | Mar. 3, 1953 |
| 2,871,213 | Graulich et al. | Jan. 27, 1959 |
| 2,914,480 | Hagopian | Nov. 24, 1959 |
| 2,931,740 | Riboni | Apr. 5, 1960 |
| 2,969,143 | De Bell | Jan. 24, 1961 |

FOREIGN PATENTS

| | | |
|---|---|---|
| 869,452 | Great Britain | May 31, 1961 |